(12) United States Patent
Sugimura et al.

(10) Patent No.: US 11,373,409 B2
(45) Date of Patent: Jun. 28, 2022

(54) PHOTOGRAPHY SYSTEM (71) Applicant: HITACHI KOKUSAI ELECTRIC INC., Tokyo (JP)

(72) Inventors: Yu Sugimura, Tokyo (JP); Kazunari Iwanaga, Tokyo (JP); Yohei Akimoto, Tokyo (JP)

(73) Assignee: Hitachi Kokusai Electric Inc., Tokyo (JP)

(*) Notice: Subject to any disclaimer, the term of this patent is extended or adjusted under 35 U.S.C. 154(b) by 0 days.

(21) Appl. No.: 17/310,231

(22) PCT Filed: Jan. 16, 2020

(86) PCT No.: PCT/JP2020/001299
§ 371 (c)(1),
(2) Date: Jul. 27, 2021

(87) PCT Pub. No.: WO2020/174916
PCT Pub. Date: Sep. 3, 2020

(65) Prior Publication Data
US 2022/0044027 A1  Feb. 10, 2022

(30) Foreign Application Priority Data

Feb. 26, 2019  (JP) .............................. JP2019-033160

(51) Int. Cl.
G06V 20/52 (2022.01)
H04N 5/232 (2006.01)
(Continued)

(52) U.S. Cl.
CPC ........... G06V 20/52 (2022.01); G06K 9/6256 (2013.01); G06N 3/08 (2013.01); H04N 5/23218 (2018.08)

(58) Field of Classification Search
CPC .. G06V 20/52; H04N 5/23218; G06K 9/6256; G06N 3/08
See application file for complete search history.

(56) References Cited

U.S. PATENT DOCUMENTS

2019/0317839 A1   10/2019  Misumi et al.
2021/0073953 A1*   3/2021  Lee ...................... G06N 3/0454
2022/0084169 A1*   3/2022  Sugai ..................... G06T 5/006

FOREIGN PATENT DOCUMENTS

JP   2000101913 A    4/2000
JP   2009267792 A   11/2009
(Continued)

OTHER PUBLICATIONS

Fang et al. "A point cloud-vision hybrid approach for 3D location tracking of mobile construction assets." 33rd International Symposium on Automation and Robotics in Construction (ISARC 2016). Proceedings of the International Symposiumon Automation and Robotics in Construction. vol. 33. 2016). (Year: 2016).*

(Continued)

Primary Examiner — Pinalben Patel
(74) Attorney, Agent, or Firm — Greer Burns & Crain Ltd.

(57) ABSTRACT

The structure examination support system 100 in the present example is provided with a GNSS receiver 120 that measures the current location, an image pick-up device 110 that photographs a target, and a calculating device 130 that controls the image pick-up device 110, where these are equipped in a moving body. The computing device 130 controls the image pick-up device 110 on the basis of the installation location of the target that has been set in advance, the current location that has been measured by the GNSS receiver 120, and the moving speed of the vehicle so as to repeat photography a number of times, and carries out an image recognition process on each of the plurality of (Continued)

images outputted from the image pick-up device 110, and thus selects an image where the target is photographed and that is appropriate for the examination.

4 Claims, 5 Drawing Sheets

(51) Int. Cl.
*G06K 9/62* (2022.01)
*G06N 3/08* (2006.01)

(56) References Cited

FOREIGN PATENT DOCUMENTS

| | | |
|---|---|---|
| JP | 2015094727 A | 5/2015 |
| JP | 2016018463 A | 2/2016 |
| JP | 2017028640 A | 2/2017 |
| JP | 2017138162 A | 8/2017 |
| JP | 2018018461 A | 2/2018 |
| WO | 2018110095 A1 | 6/2018 |

OTHER PUBLICATIONS

ISR issued in PCT/JP2020/001299, dated Apr. 14, 2020.

\* cited by examiner

FIG.5

PHOTOGRAPHY SYSTEM

This is a National Phase Application filed under 35 U.S.C. § 371, of International Application No. PCT/JP2020/001299, filed Jan. 16, 2020, the contents of which are incorporated by reference.

TECHNICAL FIELD

The present invention relates to a photography system where an image pick-up device equipped in a moving body automatically takes an image of a target.

BACKGROUND ART

Conventional image pick-up devices such as monitor cameras have been used to monitor an object that enters into an area to be monitored. In addition, a technology for allowing a monitor device (or system) to automatically monitor instead of a person has been examined. Such a monitor device has functions of recording only the images where a moving object appears by utilizing the detection results or of attracting attention by a person by displaying a warning icon on the display device or by setting off a buzzer. Accordingly, the use of a monitor device is helpful for reducing the load of the monitoring service as compared to the case where a confirmation operation is carried out continuously.

As an example of a technology for automatically detecting an object that enters into an area to be monitored, a conventional monitoring technology by utilizing a method that is referred to as a background subtraction method has been widely used (see Patent Literature 1). In accordance with an object detection method by means of the background subtraction method, the difference in the brightness (or the pixel value) between the input image that is gained from an image pick-up device or the like and the background image that is to be used as a reference where an image of the object to be detected is not shown is calculated so that monitoring can be carried out under the assumption that the object to be detected exists in a varied area where the value (difference) is great as compared to a predetermined threshold value or there is a possibility thereof.

In the technology disclosed in Patent Literature 1, two types of chronological changes, that is to say, one that is of the target itself, and the other that is of a relative change between the target and the background (such as the inclination of a telephone pole), are automatically detected from two photographed images that are chronologically different and are acquired by means of a terminal device equipped with a photographing function and a positioning function.

There are also methods for detecting an area of the object from a single input image that is gained from an image pick-up device or the like, and an example thereof is a selective search (SS) technique. In accordance with the SS technique, an area where the object exists or there is a possibility thereof is detected on the basis of the degree of similarity of a color or a texture of the input image.

PRIOR ART LITERATURE

Patent Literature

Patent Literature 1: JP2016-18463A

SUMMARY OF THE INVENTION

Problems to be Solved

A large number of staff is required for regular inspections of outdoor structures (houses, signs, telephone poles, signals and the like), or inspection tours after a disaster has occurred. As a means for simplifying these operations, there is an examination support system for collecting data by equipping a vehicle that runs on a road with a GNSS (Global Navigation Satellite System) receiver, a 360-degree camera, a LiDAR (Light Detection and Ranging) unit and the like. This system is used in order to examine the flatness of a road and the shape of a tunnel, for example, by recognizing the three-dimensional coordinates of the surroundings through the simultaneous usage of a laser and a camera.

When an outdoor structure is examined, there is a case where a crack on the surface or a change in the color is recorded. In such an examination, data has been managed through visual inspection and the use of images taken by a person, and therefore, a large amount of labor and time is required. It is difficult to deal with a case where a technique by means of automatic photography is introduced by using the conventional examination support system because the state of the surface of an object cannot be observed well unless the photographed images are visible with high quality and with little distortion. In the case where the entirety of a structure is examined, images taken in a number of directions are required instead of only an image taken in the forward direction. Furthermore, there is a case where the view is interrupted by a surrounding structure such as a guardrail or a person, and therefore, the image taken at the optimal moment for the inspection differs. Accordingly, automatic photography that is simply linked with a GNSS requires a large amount of time and effort due to the correspondence between the images taken in a number of directions and the selection of images that can be used for the inspection by the user.

The present invention has been made in view of the conventional situation as described above, and an object thereof is to propose a technology with which it is possible to efficiently collect images that are suitable for the examination of a structure.

Solution to Problems

In order to achieve the above-described object, the present invention provides a photography system that is constructed as follows.

The photography system according to the present invention is a photography system where a positioning device that measures the current location, an image pick-up device that photographs a target, and a control device that controls the image pick-up device are equipped in a moving body, and is characterized in that the control device repeats photography a number of times by controlling the image pick-up device on the basis of the installation location of the target that has been set in advance, the current location that has been measured by the positioning device, and the moving speed of the moving body, carries out an image recognition process on each of a plurality of images outputted from the image pick-up device, and selects an image that shows the target and is appropriate for examination.

As described above, the photography system according to the present invention is constructed so that an image of the same target is taken a number of times, and then, an image that is appropriate for inspection is automatically selected from among the thus-taken plurality of images. As a result, it becomes possible to efficiently collect images that are appropriate for the inspection of a structure with an extremely small number of staff.

Here, an example of the constructed photography system may be provided with a configuration where the control device utilizes a learning model that has been generated in advance through deep learning by using an image where the distortion of the target is small, an image where the target is close to the center, an image where the target is not partially shown, and an image where the target is only slightly obstructed as correct training data in order to sample an image showing the target from among a plurality of images outputted from the image pick-up device.

Another example of the constructed photography system may be provided with a configuration where the control device selects an image of which the degree of similarity to an image registered in advance is the highest or an image that has been taken from the location that is the closest to the target as an image that is appropriate for the examination in the case where a plurality of images of the target have been taken.

Still another example of the constructed photography system may be provided with a configuration where the image pick-up device photographs the target in a plurality of directions, and the control device groups the respective images of the target that have been taken in the plurality of directions.

Advantageous Effects of the Invention

The photography system according to the present invention makes it possible to efficiently collect images that are appropriate for the examination of a structure.

DESCRIPTION OF EMBODIMENTS

An embodiment of the present invention is described in reference to the drawings. In the following, a structure examination support system for collecting images that are appropriate for the examination of a structure (asset) such as a road, a bridge or a sign after taking vivid images of the structure by using an image pick-up device such as a single-lens reflex camera is described as an example.

Figure 1:
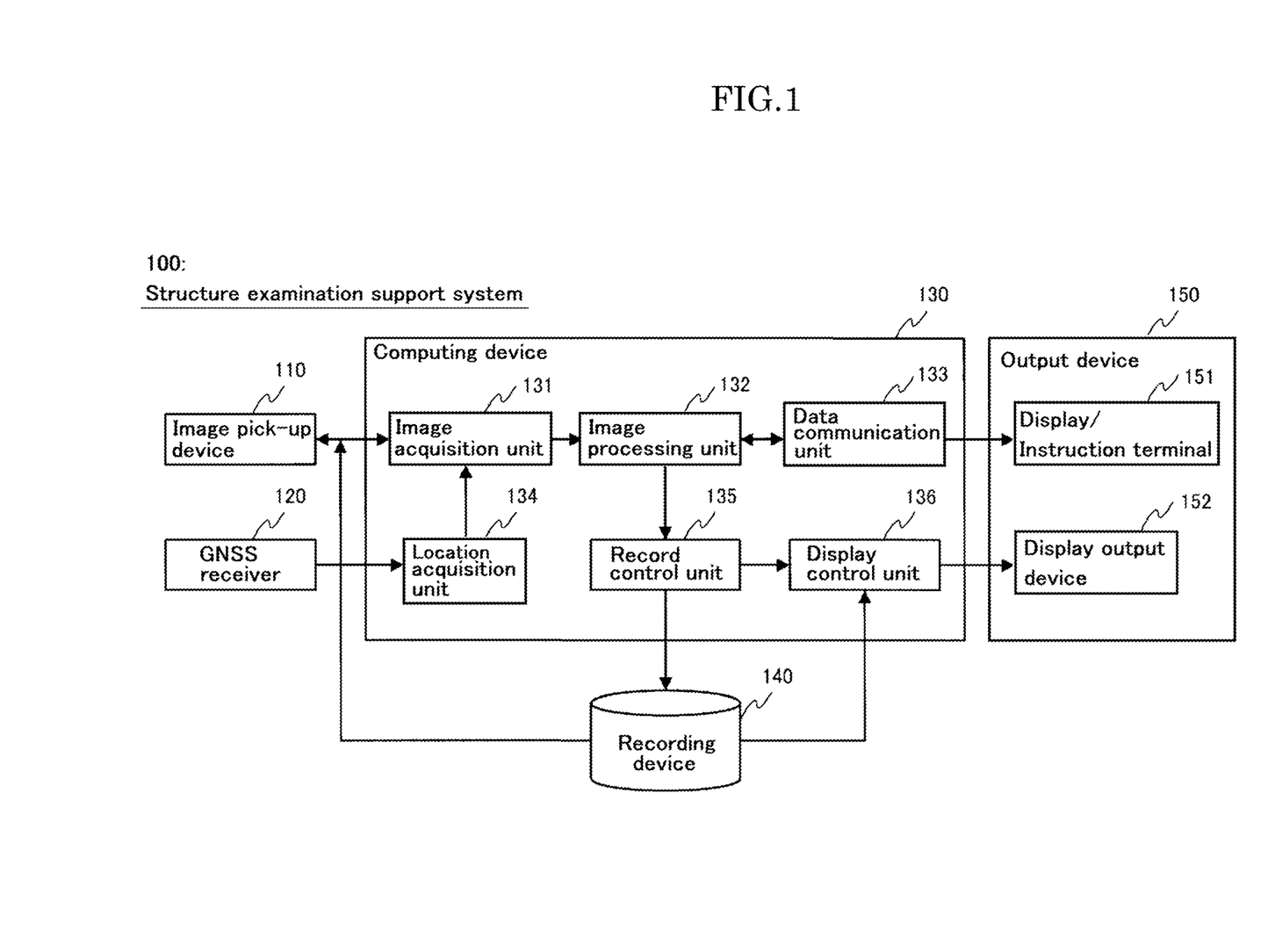
FIG. 1 is a diagram showing an example of the configuration of the structure examination support system according to one embodiment of the present invention.

FIG. 1 shows an example of the configuration of the structure examination support system 100 according to one embodiment of the present invention. The structure examination support system 100 is formed as an electronic computer system that is equipped with a processor such as a CPU (central processing unit) and a memory as the hardware resources in such a manner that respective functions are carried out when a program that has been stored in the memory in advance is run by means of the processor. Here, the hardware resources used therein may include a DSP (digital signal processor), an FPGA (field programmable gate array), a GPU (graphics processing unit) and the like.

The structure examination support system 100 is provided with an image pick-up device 100, a GNSS receiver 120, a computing device 130, a recording device 140 and an output device 150. In the present example, these devices are equipped in a vehicle that is to run on a road. Here, the image pick-up device 110 corresponds to the image pick-up device in the present invention, the GNSS receiver 120 corresponds to the positioning device in the present invention, and the computing device 130 corresponds to the control device in the present invention.

The image pick-up device 110 is a device for taking images of a structure to be examined, and a high-quality camera such as a single-lens reflex camera or a 4K camera is used in order to vividly grasp the state of a structure. By using a high-quality camera as the image pick-up device 110, images from which a crack or a scratch on a structure can be recognized can be taken. The image pick-up device 110 is equipped in a vehicle so as to be directed in a certain direction, such as the forward direction, the right direction, the left direction, the upward direction, and the backward direction of the vehicle. The location in which the image pick-up device 110 is equipped, the direction in which the images are taken, and the number of additional image pick-up devices are determined in accordance with the type of the structure to be examined (target of photography). In the case where images of a telephone pole that is installed on the left side relative to the direction in which the vehicle progresses are desired to be taken in the lateral direction, for example, the image pick-up device 110 may be equipped in the vehicle so as to be directed in the left direction as viewed from the vehicle. The images taken by the image pick-up device 110 are outputted to the computing device 130.

The GNSS receiver 120 is a device for measuring the current location, and a GPS (global positioning system) receiver is used, for example. The GNSS receiver 120 specifies the current location (latitude and longitude, for example) on the basis of the radio wave from a positioning satellite, and then outputs the information on the current location to the computing device 130.

The computing device 130 is provided with an image acquisition unit 131, an image processing unit 132, a data communication unit 133, a location acquisition unit 134, a record control unit 135 and a display control unit 136. The computing device 130 may be formed as one device or may be formed as a collective body of a plurality of devices, and thus, it does not matter how the device is formed.

The location acquisition unit 134 acquires information on the current location from the GNSS receiver 120 and outputs the information to the image acquisition unit 131. The image acquisition unit 131 controls the image pick-up device 110 concerning the photography on the basis of the information on the current location, acquires real-time image data, and outputs the data to the image processing unit 132 together with the information on the current location. The image pick-up control by the image acquisition unit 131 is described in detail in the following. In addition, the image acquisition unit 131 may acquire image data in one-dimensional, two-dimensional or three-dimensional arrangement from the image signal that has been inputted from the recording device 140 where image data is recorded.

Processes such as smoothing filtering, contour highlighting filtering and density conversion may be carried out on the image data as pre-processing in order to reduce the effects from noise or flickering. In addition, a data format such as RGB color or monochrome may be selected in accordance with the application. Furthermore, a scaling-down process may be carried out on the image data so that the images become a predetermined size from the point of view of a reduction of the process cost.

The image processing unit 132 selects the image that is optimal for the examination in response to the input of the image data gained from the image acquisition unit 131 and the information on the current location. The image selection by the image processing unit 132 is described in detail in the following.

The data communication unit 133 transmits the results from the image processing unit 132 and the information stored in the recording device 140 to other apparatuses installed in the local area, the monitoring center in the network and the like.

The record control unit 135 uses the results of detection and the image selection by the image processing unit 122 so as to control the recording of images and the compression ratio or the recording intervals of the recorded images.

The display control unit 136 controls the display of the images acquired by the image acquisition unit 121, the results of the detection and the image selection by the image processing unit 132, and the data stored in the recording device 130.

The recording device 140 records and stores the images gained by the image acquisition unit 121 in accordance with the order by the record control unit 124. In addition, the recording device 140 transmits the stored data in accordance with the request from the display control unit 136 or the like.

The output device 150 is provided with a display/instruction terminal 151 and a display output device 152.

The display/instruction terminal 151 accepts an instruction from the user such as the setting of parameters to be used for the processes in the image acquisition unit 131 and the image processing unit 132.

The display output device 152 displays various pieces of information such as images acquired by the image acquisition unit 121, results of the detection and the image selection by the image processing unit 132, the data stored in the recording device 130 and the like in accordance with the control by the display control unit 136.

Figure 2:
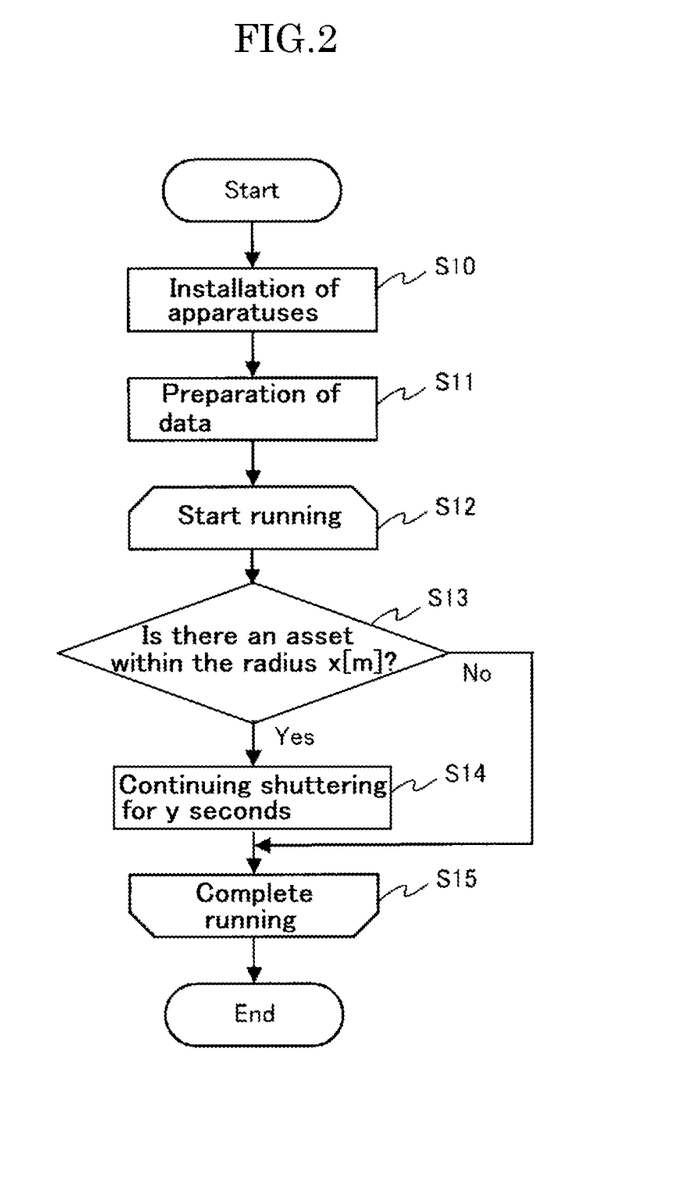
FIG. 2 is a flow chart at the time of photography in the structure examination support system in FIG. 1.

Next, the operation at the time of photography in the structure examination support system 100 in the present example is concretely described in reference to the flowchart in FIG. 2.

First, apparatuses that are required for photography such as the image pick-up device 110 and the GNSS receiver 120 are installed in a vehicle (step S10).

Subsequently, data that is required for automatic photography is prepared (step S11). For example, information on the installation location of a structure (a telephone pole, for example) registered as an examination target (photography target) is stored in the recording device 140 in advance.

After that, the following processes are carried out (steps S12 through S15) after the vehicle has started running and until the running is completed (until the tour that covers the range where the photography target could exist is completed).

The image acquisition unit 141 determines whether or not the vehicle approaches within a range of a certain radius x [m] of the target on the basis of the installation location of the target that has been registered in advance, the current location that has been measured by the GNSS receiver 120, and the moving speed of the vehicle (step S13). Then, photography is instructed to the image pick-up device 110 so that shuttering is continuously and automatically repeated for y seconds in the case where it has been determined that the vehicle has approached the target within a range of the radius x [m] (step S14).

The moving speed of the vehicle and the direction in which the vehicle moves can be calculated on the basis of the chronological transition of the current location that is gained from the GNSS receiver 120 at predetermined intervals of measurement. Here, the configuration may allow the information on the speed to be acquired from the vehicle; however, the system configuration can be simplified in the present example where the results of measurement are utilized. In addition, the distance vis-à-vis the target when the photography is started and the period of time during which the photography continues (the period of time during which shuttering is repeated) can be set freely.

Figure 3:
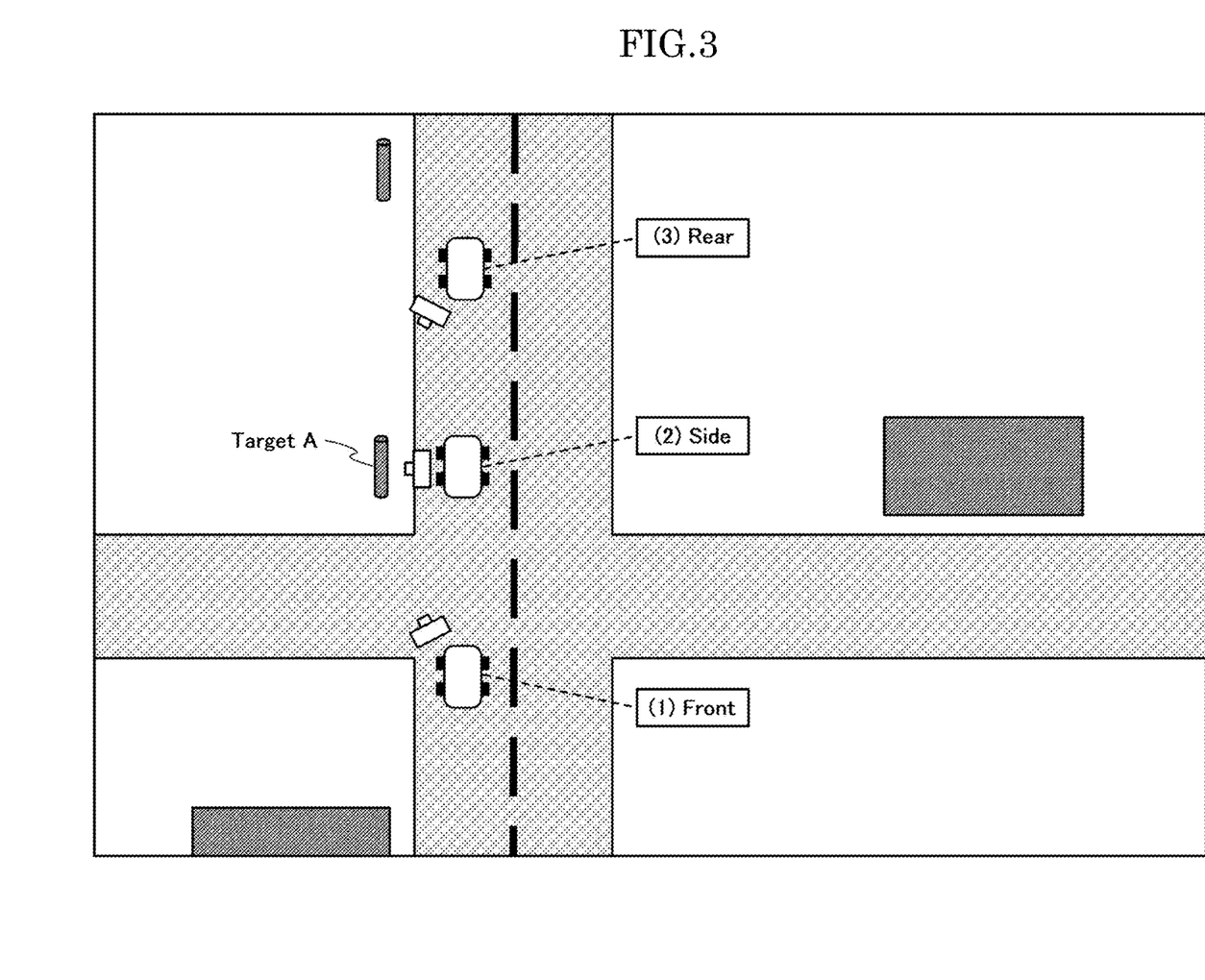
FIG. 3 is a diagram illustrating the mechanism of automatic photography in the structure examination support system in FIG. 1.

Next, the mechanism of the automatic photography in the structure examination support system 100 in the present example is described in reference to FIG. 3.

Automatic photography is carried out on the basis of the distance between the installation location of the target and the current location of the vehicle. In the present example, a plurality of image pick-up devices 110 is equipped in the vehicle so that images of the target can be taken in a plurality of directions. Concretely, a front camera that is directed to the front of the vehicle, a side camera that is directed to a side of the vehicle (left direction, for example), and a rear camera that is directed to the rear of the vehicle are equipped in the vehicle. The optimal timing for shuttering of these cameras differs depending on the direction in which the vehicle moves and the moving speed. Therefore, the image acquisition unit 141 in the present example manages the respective timings for shuttering of the front camera, the side camera and the rear camera independently, taking into consideration the locational relationship between the target and the vehicle and the direction in which the vehicle moves.

In addition, the information on the current location that is acquired by the GNSS receiver 120 may include an error, and therefore, it is necessary for the period of photography to have a margin. Here, the photography distance in the case where the front camera takes an image is in a range of 10 to 15 m in front of the target, the photography distance in the case where the side camera takes an image is in a range from 2 m in front of the target to 2 m behind the target, and the photography distance in the case where the rear camera takes an image is in a range from 10 to 15 m behind the target. Provided that the moving speed of the vehicle is 30 km/h, the system is controlled so that the front camera continues shuttering for 0.6 seconds starting from the moment when the distance between the target and the vehicle becomes 15 m in the case where the target and the vehicle approach each other, and the target faces the side of the car lane through which the vehicle progresses (in the case where the location of the target is not on the opposite car lane side). In addition, the system is controlled so that the side camera continues the shuttering for 0.48 seconds from the moment when the distance between the target and the vehicle becomes 2 m. Likewise, the system is controlled so that the rear camera continues the shuttering for 0.48 seconds from the moment when the distance between the target and the vehicle becomes 10 m after the vehicle has passed the target.

Here, it is ideal for the vehicle to be able to continue running at a constant moving speed; however, in reality, it is possible for the vehicle to stop at a signal close to the target or to run at a low speed due to traffic congestion. Therefore, photography may be stopped or the intervals of the shooting may be made shorter (or longer) in accordance with the moving speed or the acceleration of the vehicle.

Here, the image data that is gained through photography is managed for each installation location of the target, and the images and locations are made to correspond on the basis of the time at which each camera, front, side or rear, takes an image. For example, when the location of the vehicle at the time when the photography starts is 15 m in front of the target A, the images that are taken for 0.6 seconds after the start of photography are grouped as a front image group of the target A. Likewise, the images that are taken during 0.48 seconds starting from the time when the location of the vehicle is 2 m in front of the target A are grouped as a side image group of the target A. In addition, the images that are taken during 0.6 seconds starting from the time when the location of the vehicle is 10 m behind the target A are grouped as a rear image group of the target A.

Figure 4:
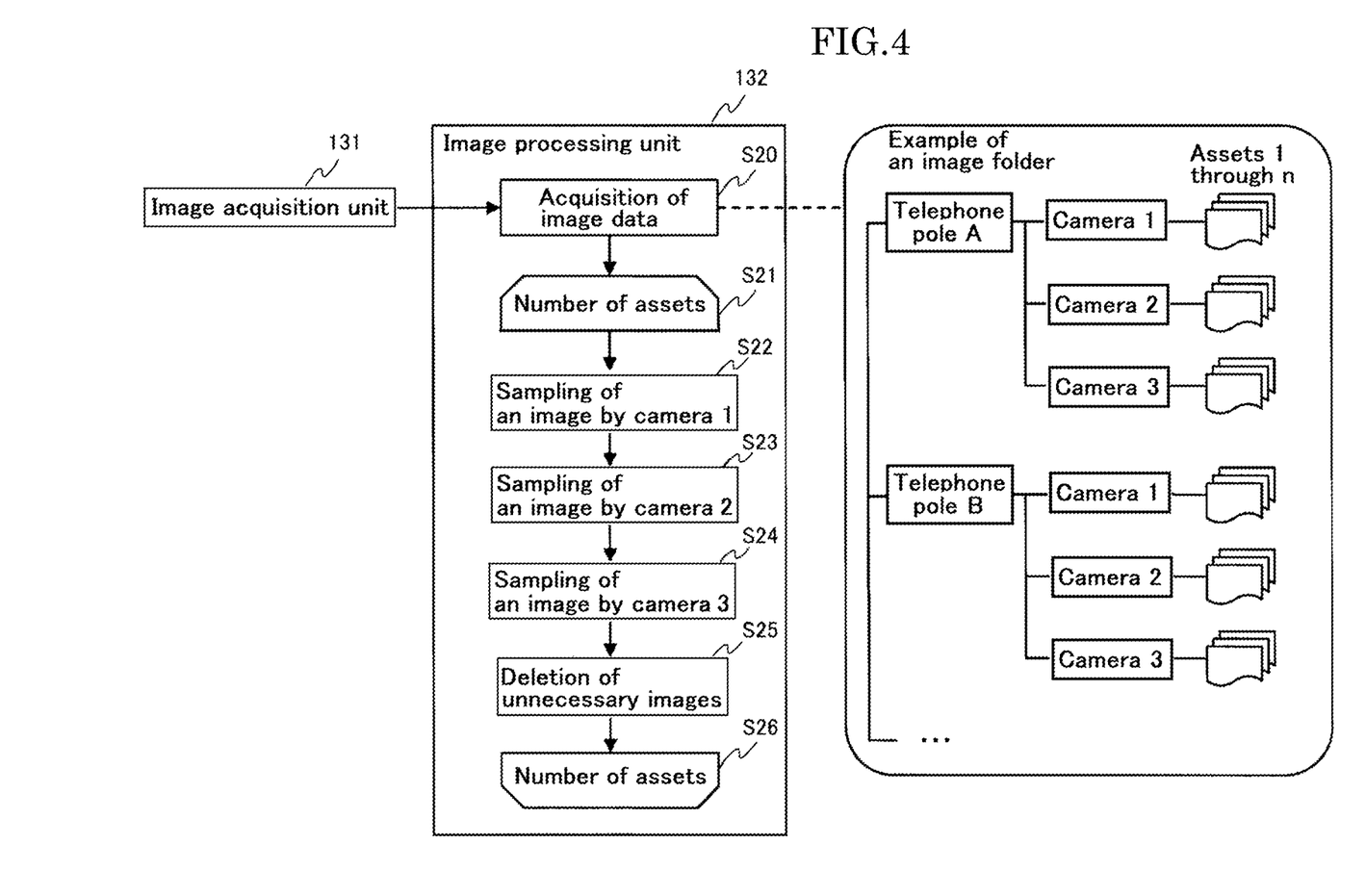
FIG. 4 is a diagram illustrating the mechanism of image selection in the structure examination support system in FIG. 1.

Next, the operation of the image processing unit 132 is concretely described in reference to FIG. 4. Here, the "camera 1," "camera 2" and "camera 3" in the following description are respectively a front camera, a side camera and a rear camera.

The image processing unit 132 acquires image data from the image acquisition unit 131 (step S20). The image data is managed by allowing the images to be grouped for each asset, which is a target, on the basis of the results of measurement by the GNSS receiver 120 as an example of the image folder shown in FIG. 4.

Subsequently, the image processing unit 132 carries out the following processes on all the assets that are set to be examined (steps S21 through S26).

The image that is optimal for the examination is selected from among a plurality of pieces of image data (front image group) taken by the camera 1 (step S22). Likewise, an optimal image is selected from among a plurality of pieces of image data (side image group) taken by the camera 2 (step S23), and an optimal image is selected from among a plurality of pieces of image data (rear image group) taken by the camera 3 (step S24). After that, unnecessary images (images that have not been selected as optimal images) are deleted (step S25).

The selection of an optimal image is carried out as described below, for example. First, concerning each of the plurality of images, the edges of the image are detected so as to view the characteristics thereof, and thus, candidate areas of the target within the image are sampled. In the case where candidate areas are sampled from a plurality of images, the image where the number of pixels in the candidate area is the greatest is selected as an optimal image from among these images.

In another example, whether or not there is a target within the image is recognized for each of the plurality of images by means of deep learning using an image recognition process that is represented by a convolutional neural network (CNN). In the deep learning, the images where the distortion of the target is small, the images where the target is close to the center, the images where the target is not partially shown, the images where the target is only slightly obstructed and the like are included in correct training data (positive images), whereas the images that do not correspond to these are included in incorrect training data (negative images) so as to generate a learning model in advance, which is utilized for the recognition of the target within the images. Thus, this learning model is used to sample images where the existence of the target is recognized, and from among these, an image that satisfies predetermined conditions is selected as an optimal image. Examples of the predetermined conditions that are used for the selection of an optimal image include (1) conditions for selecting an image of which the degree of similarity to an image that has been registered in advance (correct training data) is the highest, (2) conditions for selecting an image that has been taken from the location that is closest to the target, and (3) conditions where these are combined.

As described above, an image that is optimal for the examination is automatically selected from among a plurality of pieces of image data where an image of the same target is taken. The image selected by the image processing unit 132 is recorded in the recording device 140, and displayed on the display output device 152 so as to be used for the visual examination. Here, automatic detection of a scratch or the like by means of image recognition may be carried out instead of the visual examination.

Figure 5:
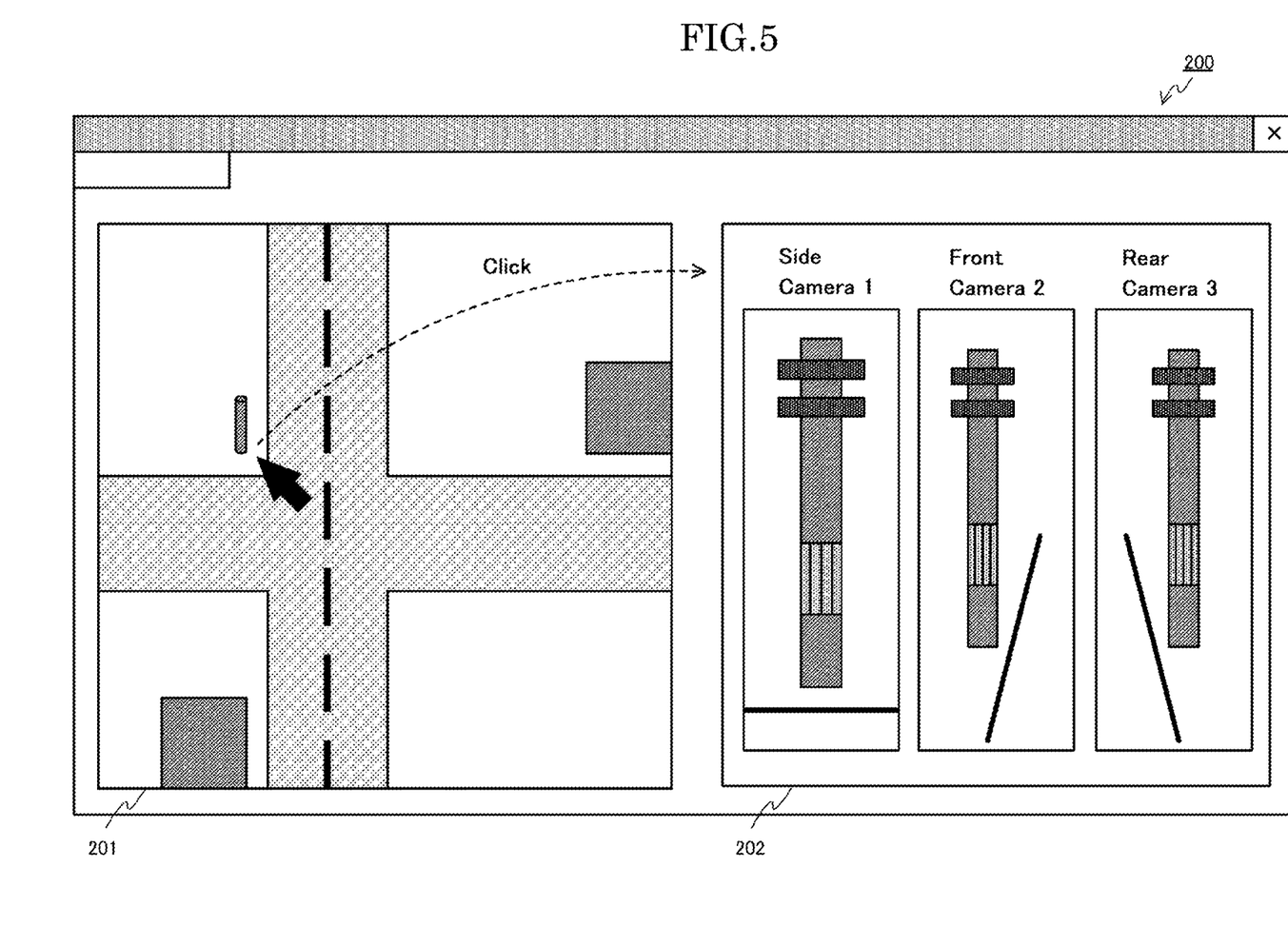
FIG. 5 is a diagram showing an example of the display of the photography results in the structure examination support system in FIG. 1.

FIG. 5 shows an example of a display of the results of photography on the display output device 152. The display output device 152 displays a photography result display screen 200 as shown in FIG. 5. The photography result display screen 200 in FIG. 5 has a map display region 201 on the left side of the screen and an object to be examined display region 202 on the right side of the screen. A mark that indicates a structure registered as an object to be examined is displayed on the map in the map display region 201. When an examiner selects the above-described mark through the click of a mouse, three optimal images that are selected from among the respective image groups where the structure is photographed in three directions, from the side, from the front and from the rear, are displayed on the object to be examined display region 202. The examiner confirms the three optimal images that are displayed on the object to be examined display region 202 and inspects the corresponding structure.

As described above, the structure examination support system 100 in the present example is provided with a GNSS receiver 120 that measures the current location, an image pick-up device 110 that photographs a target, and a calculating device 130 that controls the image pick-up device 110, where these are equipped in a moving body. The computing device 130 controls the image pick-up device 110 on the basis of the installation location of the target that has been set in advance, the current location that has been measured by the GNSS receiver 120, and the moving speed of the vehicle so as to repeat photography a number of times, and carries out an image recognition process on each of the plurality of images outputted from the image pick-up device 110, and thus selects an image where the target is photographed and that is appropriate for the examination.

As described above, the structure examination support system 100 in the present example is constructed so that an image of the same target is taken a number of times, and an image that is optimal for the examination is automatically selected from among the plurality of images that has been gained through photography. Accordingly, images that are optimal for the examination of a structure can be efficiently collected with an extremely small number of staff. As a result, unlike the conventional practice, it becomes unnecessary for an examiner to visit the venue for the examination of a structure in order to directly and visually confirm check items one-by-one, and thus, the efficiency of the structure examination increases. In addition, a high-quality camera is used as the image pick-up device 110 for photography, and thus, it becomes possible to examine the existence of a crack or a scratch on the structure.

In the above description, one image is selected as an optimal image for the examination in each direction; however, a plurality of images may be selected as being appropriate for the examination. In this case, a plurality of images may be selected in the order that the degree of similarity to an image that has been registered in advance (correct training data) is higher, a plurality of images may be selected in the order that the location from which the image is taken is closer to the target, or a plurality of images may be selected in the order that is decided by combining these.

In addition, in the above description, one image pick-up device 110 (one side camera directed to the side of the vehicle, for example) is arranged in one direction; however, a plurality of image pick-up devices 110 may be arranged in one direction. This is appropriate for the photography of a target that cannot be contained in one image when taken in the state where the vehicle has approached. In the case where a telephone pole that is long in the upward and downward directions is photographed as a target, for example, the images thereof may be taken by using two image pick-up devices, one directed in the lateral direction and the other directed diagonally upwards, and the two images taken by these two image pick-up devices may be synthesized so that an image that contains the entirety of the telephone pole may be generated. In this case, an optimal image may be selected as one of the two images to be synthesized from among the plurality of images taken by the two image pick-up devices, and the image that was taken at the time closest to the time when the optimal image was taken may be selected as the other of the two images to be synthesized from among the images taken by the image pick-up device that is not the one that took the optimal image.

In the above description, a vehicle that runs on a road is used as the moving body for automatic photography; however, other kinds of moving bodies such as a train or an unmanned aircraft (so-called "drone") may be used for automatic photography.

In the above, examples of the cases where the present invention is applied to a structure examination support system are described; however, the present invention is not limited to these examples, and it is needless to say that the present invention can be applied widely to cases other than the above.

It is also possible to provide the present invention as a method or a system for carrying out the process according to the present invention, a program for implementing such a method or system with a computer having hardware resources such as a processor and a memory, or a recording medium for storing such a program.

INDUSTRIAL APPLICABILITY

The present invention can be applied to various types of photography systems for automatically taking an image of a target with an image pick-up device equipped in a moving body.

REFERENCE SIGNS LIST

100: structure examination support system, 110: image pick-up device, 120: GNSS receiver,
130: computing device, 131: image acquisition unit, 132: image processing unit, 133: data communication unit, 134: location acquisition unit, 135: record control unit, 136: display control unit, 140: recording device, 150: output device, 151: display/instruction terminal, 152: display output device

The invention claimed is:

1. A photography system where a positioning device that measures a current location of a moving body, an image pick-up device that photographs a target, and a control device that controls the image pick-up device are equipped in the moving body, wherein the control device causes the image pick-up device to take a plurality of images of the target by controlling the image pick-up device on the basis of an installation location of the target that has been set in advance, the current location of the moving body measured by the positioning device, and a moving speed of the moving body, carries out an image recognition process on each of the plurality of images outputted from the image pick-up device, and selects an image from the plurality of images that shows the target and thereby is appropriate for examination, and the control device selects the image utilizing a learning model that has been generated in advance through deep learning by using an image where the distortion of the target is small, an image where the target is close to the center, an image where the target is not partially shown, and an image where the target is only slightly obstructed as correct training data in order to sample an image showing the target from among a plurality of images outputted from the image pick-up device.

2. The photography system according to claim 1, wherein the control device selects an image of which the degree of similarity to an image registered in advance is the highest or an image that has been taken from the location that is the closest to the target as an image that is appropriate for the examination in the case where a plurality of images of the target have been taken.

3. The photography system according to claim 1, wherein the image pick-up device photographs the target in a plurality of directions, and
the control device groups the respective images of the target that have been taken in the plurality of directions.

4. The photography system according to claim 2, wherein the image pick-up device photographs the target in a plurality of directions, and
the control device groups the respective images of the target that have been taken in the plurality of directions.

* * * * *